United States Patent [19]
Lo

[11] Patent Number: 6,108,029
[45] Date of Patent: Aug. 22, 2000

[54] DUAL-MODE 2D/3D DISPLAY SYSTEM

[76] Inventor: Allen Kwok Wah Lo, 5022 Hidden Branches Dr., Dunwoody, Ga. 30338

[21] Appl. No.: 08/916,498

[22] Filed: Aug. 22, 1997

[51] Int. Cl.[7] .................................................. H04N 13/00
[52] U.S. Cl. ............................................ 348/43; 345/419
[58] Field of Search .................................. 348/42, 51, 54, 348/43, 56, 52, 55, 57; 345/419, 6, 9; 352/57, 60, 86; 359/466, 467; 396/324; 428/15; H04N 13/00

[56] References Cited

U.S. PATENT DOCUMENTS

| | | | |
|---|---|---|---|
| 4,717,949 | 1/1988 | Eichenlaub | 358/340 |
| 5,311,220 | 5/1994 | Eichenlaub | 348/345 |
| 5,315,377 | 5/1994 | Isono et al. | 348/51 |
| 5,691,805 | 11/1997 | Lo et al. | 355/72 |
| 5,777,588 | 7/1998 | Woodgate et al. | 348/52 |
| 5,872,590 | 2/1999 | Aritake et al. | 348/54 |

*Primary Examiner*—Chris S. Kelley
*Assistant Examiner*—Gims Philippe

[57] ABSTRACT

A dual-mode display system for 2D viewing and includes an image display device and an LCD panel. The image displaying device is used to show a regular 2D image for 2D viewing and to show an interleaved image composed from a right view and a left view of a scene for 3D viewing. The LCD panel having a plurality of linear sections is used to form a parallax barrier for 3D viewing. The same LCD panel can be turned off so that all the linear sections are clear to transmit light for 2D viewing. The image displaying device can be transmissive type and the LCD panel can be placed behind or in front of the displaying device. Preferably, a large-area illuminator is used to provide illumination to the transmissive displaying device. The image displaying device can also be emissive type and the LCD panel must be placed in front of the displaying device.

5 Claims, 4 Drawing Sheets

DUAL-MODE 2D/3D DISPLAY SYSTEM

BACKGROUND OF THE INVENTION

An autostereoscopic, or 3D, display allows a viewer to see a view with depth by providing a left image and a right image to the viewer's corresponding eyes. In the past a number of displaying devices for 3D viewing have been disclosed, notably those by Eichenlaub. U.S. Pat. No. 4,717,949 (EICHENLAUB) discloses an autostereoscopic display having light emitting lines for illumination, and a light valve for image display; U.S. Pat. No. 5,311,220 (EICHENLAUB) discloses an autostereoscopic display having a transmissive display alternately displaying right and left images and a light generating/transmitting surface which has emitting regions alternately flashing on and off for separately illuminating the right and left images displayed at different times.

All these autostereoscopic displays cannot be easily converted to a regular image display so that the same display device can be used both for 2D viewing and 3D viewing.

SUMMARY OF THE INVENTION

It is an objective of the present invention to provide a method and apparatus for making an image display which can be used for both 2D and 3D viewing.

It is another objective of the present invention to provide an autostereoscopic display which can be easily converted to a regular image display for 2D viewing.

It is a further objective of the present invention to provide a parallax barrier having alternate opaque and clear linear strips wherein the spacing between adjacent clear strips can be varied.

Briefly described, the dual-mode display system, according to the present invention, uses a transmissive displaying device such as an LCD active-matrix display, or an emissive display device such as a CRT monitor or a flat-panel plasma display, to display an interleaved image containing a right image and a left image arranged in an interlaced fashion. An LCD panel having alternate opaque and clear linear sections is used as a parallax barrier to separate the right and left images so that a viewer's right and left eyes each can only see the corresponding image. Preferably a large-area illuminator is used to provide illumination to the transmissive displaying device. The LCD panel can be turned off to cause the opaque linear sections to become clear and the entire optical area of the LCD panel becomes transparent. With the LCD panel being turned off, the display system can be used to display regular 2D images without losing the pixel resolution of the image displaying device. The LCD panel can be placed either behind or in front of the transmissive displaying device, but it must be placed in front of the emissive displaying device. For the viewers, the conversion between modes for 2D and 3D viewing is simple. It can be effected by a single switch which turns the LCD panel on and off.

The objectives and the scope of the present invention will become apparent upon reading the description of the drawing figures.

DETAILED DESCRIPTION OF THE INVENTION

Figure 1:
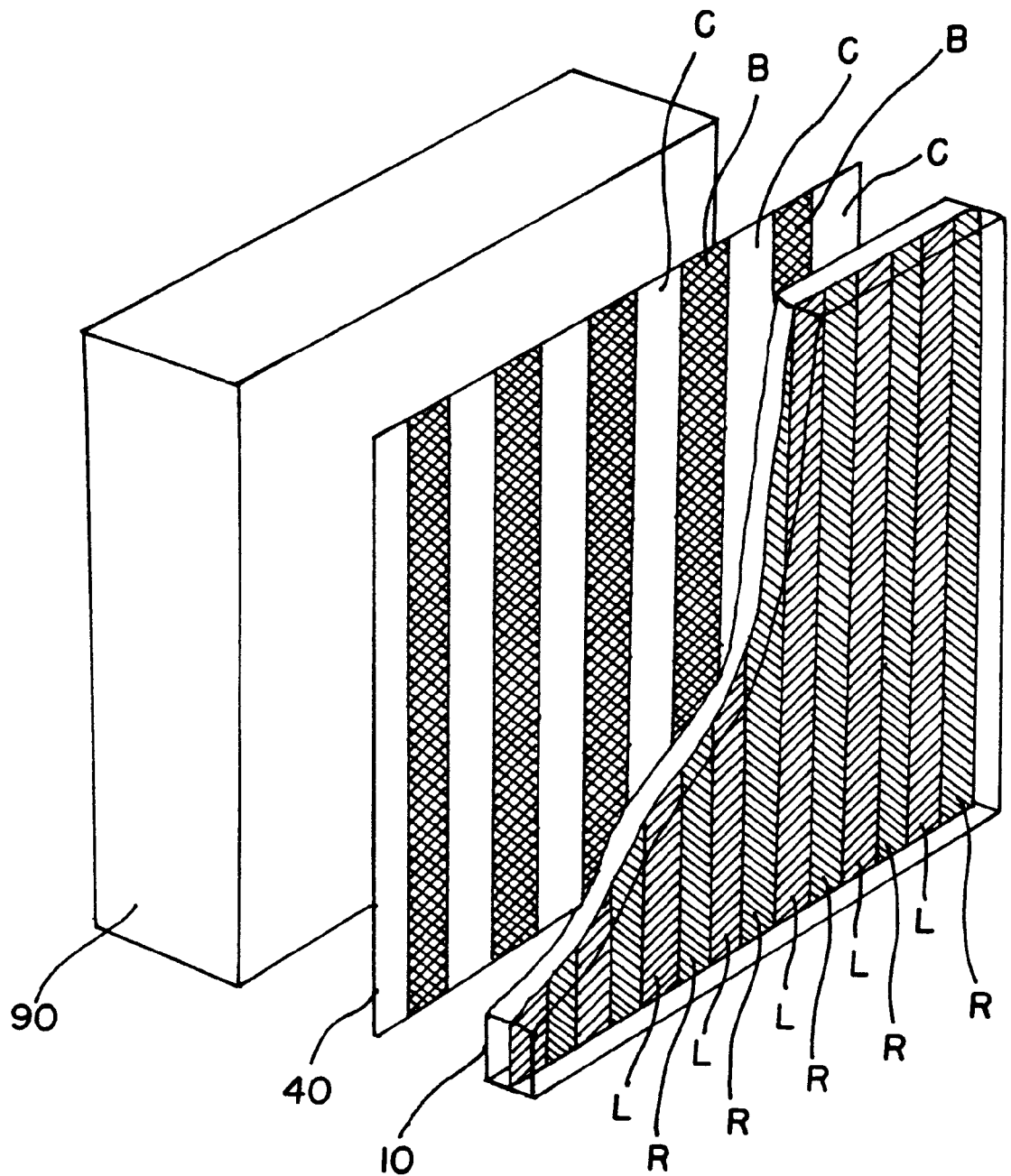
FIG. 1 illustrates the preferred embodiment of the dual-mode 2D/3D display system.

FIG. 1 illustrates the preferred embodiment of the dual-mode 2D/3D display system, according to the present invention. In FIG. 1, numeral 10 denotes a transmissive displaying device, numeral 40 denotes an LCD panel, and numeral 90 denotes a large-area illuminator to provide illumination to the image display 10. The LCD panel 40 comprises a multiplicity of linear sections which can be selectively turned on to become opaque or turned off to become clear for transmitting light. The LCD panel can be operated in two different states: a first state where all the linear sections are turned off so that the entire LCD panel is clear; and a second state where the linear sections are turned on to become opaque so that the LCD panel becomes a parallax barrier having alternate clear and opaque linear sections as shown in FIG. 1. As shown, the opaque linear sections, indicated by letter B, are separated by clear sections C. Preferably, the displaying device 10 is a matrix display comprising a multiplicity of rows and columns of pixels as on any digital image displaying device. When the displaying system is used in the 3D mode, the columns are divided into two groups: the odd-number columns and the even-number columns. In an interlaced or interleaved fashion, one group of pixel columns displays the right view of a scene while the other group displays the left view. As shown in FIG. 1, the interleaved image displayed on the transmissive displaying device contains sections of a right image as indicated by letter R and sections of a left image as indicated by letter L. When the LCD is operated in the second state where the entire panel is clear. Like a glass plate inserted in the optical path, the clear LCD panel does not have any particular optical function. Thus, the displaying device can be used as a regular image display to show 2D images for 2D viewing. The switching between the first state and the second state of the LCD panel can be effected electronically with a single switch.

Figure 2A:
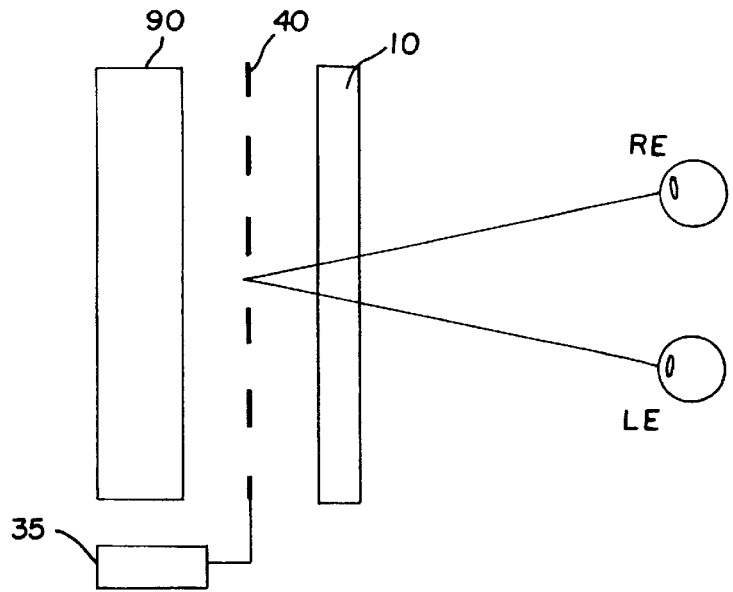
FIG. 2A and FIG. 2B illustrate the different arrangements of the LCD panel in relation to the image displaying device in the dual-mode display system.
Figure 2B:
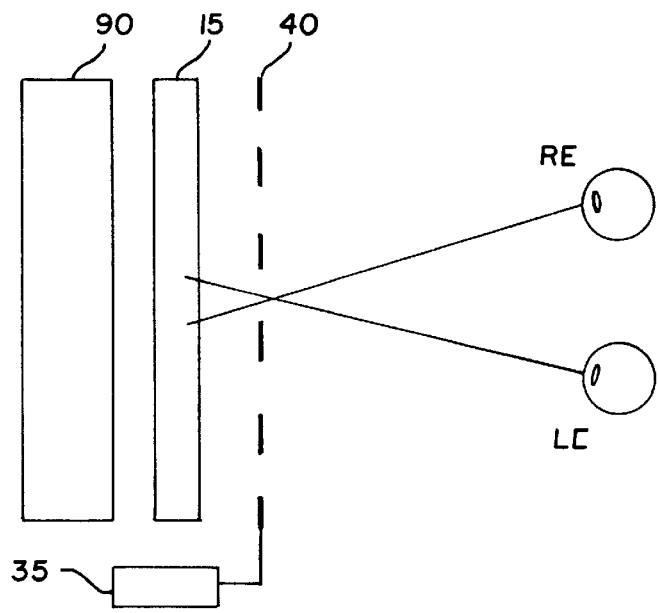

FIG. 2A and FIG. 2B show different positions of the LCD panel in relation to the image displaying device. As shown in FIG. 2A, an LCD panel 40 is placed behind a transmissive displaying device 10, and a large-area illuminator 90 is placed behind the LCD panel to provide illumination to the displaying device 10. A switch 35 is used to change the operating states of the LCD panel between being transparent panel and being a parallax barrier. In FIG. 2B, the LCD is placed in front of the displaying device. The displaying device 15 can be a transmissive device which is illuminated by a large-area illuminator 90. The displaying device 15 can also be an emissive device. In that case, the illuminator 90 is not needed.

Figure 3:
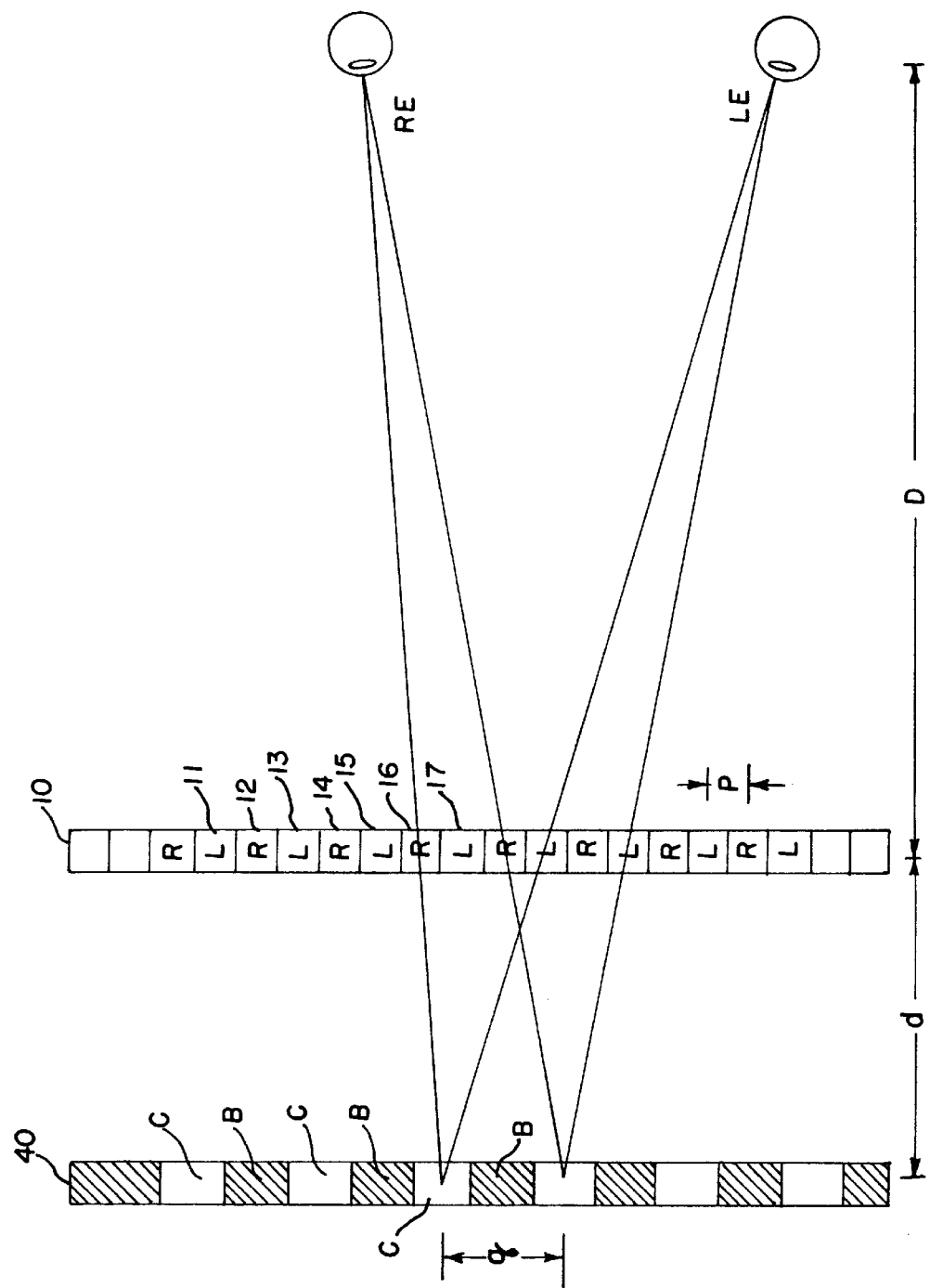
FIG. 3 shows the proper distance between the LCD panel and the image displaying device and the spacing between adjacent clear linear strips when the LCD panel is used as a parallax barrier.

FIG. 3 shows the spacing between the clear linear sections on the LCD panel when the panel is operated in the second state for 3D viewing. As shown in FIG. 3, the LCD panel 40 is placed behind the transmissive displaying device 10. Being used as a parallax barrier, the LCD panel has alternate opaque and clear linear sections, respectively denoted by letter B and letter C. The image display shows an interleaved image containing a right view and a left view displayed in alternate pixel columns. For example, columns 11, 13, 15 show part of the left view while columns 12, 14, 16 show part of the right view. The spacing between adjacent pixel columns on the displaying device is denoted by letter p. The distance of a viewer from the displaying device is denoted by letter D while the distance between the viewer's right eye RE and left eye LE is S. In order that the opaque and clear linear sections on the LCD panel 40 properly separate the right and left views displayed on the displaying device 10, the distance, d, between the LCD panel and displaying device is given by:

$$d=(2n+1)p(D+d)/S \qquad (1)$$

where n is a positive integer (including 0). As shown in FIG. 3, n=1, or d=3p(D+d)/S. The spacing, q, between adjacent clear linear sections is given by:

$$q=2p(D+d)/D \qquad (2)$$

By changing the sign of d on the right-hand side of the equations from positive to negative, the above equations can be used to calculate the distance d and the spacing q when the LCD panel is placed in front of the displaying device.

Figure 4:
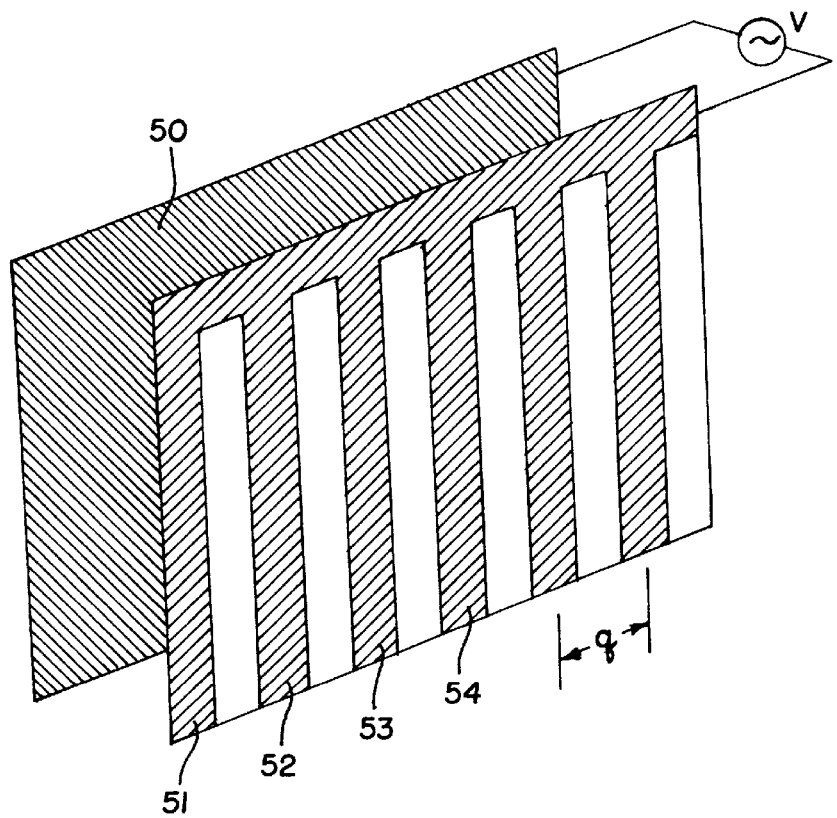
FIG. 4 illustrates the arrangement of electrodes on the LCD panel.

FIG. 4 illustrates the arrangement of electrodes on an LCD panel. To be used as a parallax barrier for 3D viewing, the LCD panel has alternative opaque and clear linear sections when the LCD panel is activated. As shown in FIG. 4, the electric field to activate liquid-crystal material in the LCD panel is provided by a ground plane 50 and a group of electrodes 51, 52, 53, . . . which are electrically connected together. The spacing between the electrodes is q. As in most LCD devices, the electrodes are transparent so that when the electric field is turned off, the entire LCD panel is clear. When the electric field is turned on by a voltage source V, the linear sections behind the electrodes become opaque to block light from transmitting therethrough.

Figure 5:
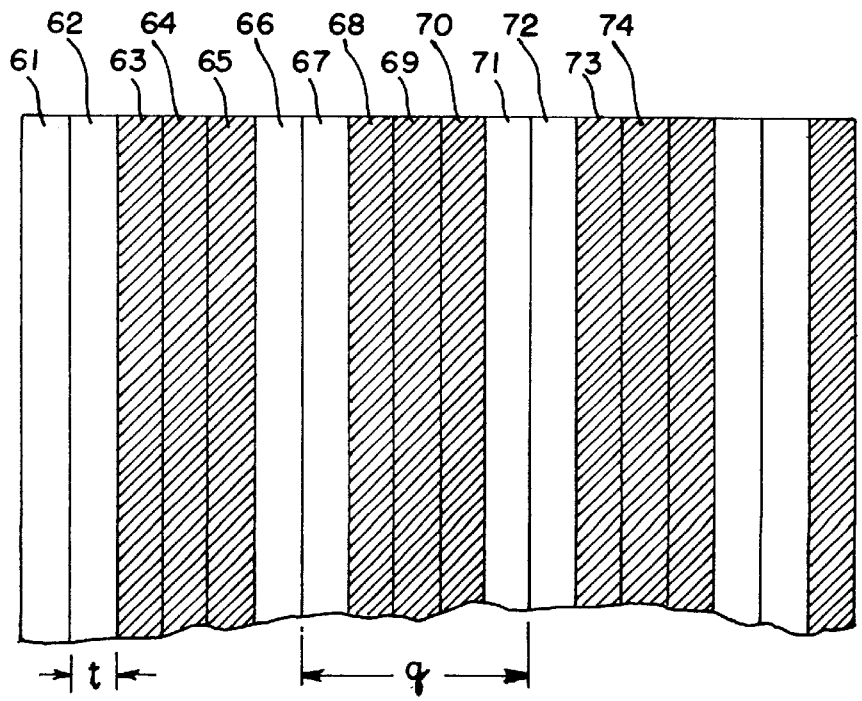
FIG. 5 illustrates another arrangement of electrodes on the LCD panel.

FIG. 5 illustrates another design of the electrodes on an LCD panel. Unlike the electrodes which are connected together as shown in FIG. 4, the electrodes shown in FIG. 5 can be individually addressed and selectively turned on so that the opaque linear sections in an LCD panel can be changed to suit the pixel resolution of the image displaying device. Electrodes 61, 62, 63, . . . 71, 72, . . . , which have a common width t, can be grouped in many different way. As shown, electrodes 63, 64, 65, 68, 69, 70 are turned on so that the linear sections behind these electrodes become opaque while the linear sections behind electrodes 61, 62, 66, 67, 71, 72, . . . remain clear to transmit light. With this electrode grouping, the blocking linear strips in the parallax barrier are wider than the clear strips, and the spacing between adjacent clear linear sections, q, is equal to 5t. But the electrodes can be grouped differently. For example, electrodes 63, 64, 67, 68, 71, . . . can be turned on to provide opaque strips in the parallax barrier while electrodes 61, 62, 65, 66, 69, 70 . . . are turned off to provide clear strips. In that case, the spacing q is equal to 4t. In this design, the spacing in the parallax barrier can be changed to suit the pixel resolution of the displaying device, with q=nt where n is a positive integer greater than 0.

While the present invention has been disclosed in preferred forms and the drawing figures are for illustrative purposes only, it shall be understood by those skilled in the art that many modifications, additions and deletions can be made therein without departing from the scope of the invention as set forth in the appended claims.

What is claimed is:

1. A dual-mode display system for 2D and 3D viewing comprising:

a) image displaying means comprising a plurality of pixel columns to show a regular 2D and 3D viewing and to show an interleaved image composed from a right view and a left view of a scene for 3D viewing; and b) an LCD panel comprising a plurality of linear sections substantially parallel to the pixel columns of said image displaying means; said LCD panel being electronically operable in a first state for 2D viewing when all the linear sections are clear to transmit light and in a second state for 3D viewing when the linear sections are activated to form a parallax barrier having alternate opaque and clear linear strips, wherein said image displaying means and said LCD panel are disposed in an opposed relationship with a distance therebetween, and said clear linear strips in said second state are disposed at a spacing, said distance and said spacing being given respectively by formulae set forth below:

$$d=(2n+1)p(D+d)/S$$

$$q=2p(D+d)/D$$

where "d" is said distance, "n" is zero or a positive integer, "p" is a spacing between adjacent ones of said pixel columns, "D" is a distance of a viewer from said image displaying means, "S" is a distance between right and left eyes of the viewer, "q" is said spacing between said clear linear strips in said second state.

2. The display system of claim 1 wherein said image displaying means comprises a transmissive image displaying device, said display system further comprising a large-area illuminator to provide illumination to said transmissive image displaying device.

3. The display system of claim 4 wherein said image displaying means comprises an emissive image displaying device.

4. The display system of claim 1 wherein said LCD panel is located in front of said image displaying means, and "d" on the right-hand side of each of said formulae has a negative sign.

5. The display system of claim 2 wherein said LCD panel is located between said illuminator and said image displaying means, and "d" on the right-hand side of each of said formulae has a positive sign.

* * * * *